United States Patent
Matsuura

(10) Patent No.: US 7,301,444 B2
(45) Date of Patent: Nov. 27, 2007

(54) METHOD AND APPARATUS FOR ALARMING DECREASE IN TIRE AIR-PRESSURE AND THRESHOLD CHANGING PROGRAM

(75) Inventor: Shinichi Matsuura, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 827 days.

(21) Appl. No.: 10/657,291

(22) Filed: Sep. 9, 2003

(65) Prior Publication Data

US 2004/0046648 A1   Mar. 11, 2004

(30) Foreign Application Priority Data

Sep. 10, 2002 (JP) ............................. 2002-264068

(51) Int. Cl.
*B60C 23/00* (2006.01)
(52) U.S. Cl. ...................... 340/442; 340/444
(58) Field of Classification Search ........ 340/442–448; 73/146–148
See application file for complete search history.

(56) References Cited

U.S. PATENT DOCUMENTS

| 4,898,216 | A | * | 2/1990 | Schultz et al. ................. 141/4 |
| 5,557,552 | A | * | 9/1996 | Naito et al. .................. 702/148 |
| 5,629,873 | A | | 5/1997 | Mittal et al. |
| 6,339,957 | B1 | * | 1/2002 | Yanase et al. ................ 73/146 |
| 6,407,661 | B2 | * | 6/2002 | Arita et al. .................. 340/444 |
| 6,920,785 | B2 | * | 7/2005 | Toyofuku ...................... 73/146 |
| 7,075,421 | B1 | * | 7/2006 | Tuttle ......................... 340/449 |

FOREIGN PATENT DOCUMENTS

| EP | 0 650 856 A1 | 5/1995 |
| JP | 05-133831 A | 5/1993 |
| JP | 11-123911 A | 5/1999 |
| JP | 2000-79812 | 3/2000 |
| JP | 2000-142044 | 5/2000 |
| JP | 2002-19435 | 1/2002 |
| JP | 2002-211220 | 7/2002 |

* cited by examiner

*Primary Examiner*—Brent Swarthout
(74) *Attorney, Agent, or Firm*—Birch, Stewart, Kolasch & Birch, LLP

(57) ABSTRACT

A method for alarming decrease in tire air-pressure, which detects decrease in internal pressure of a tire attached to a vehicle and accordingly issues alarm. The method includes the steps of: detecting rotational information of the respective tires; storing the rotational information of the respective tires; displaying a summer tire, a winter tire and a run-flat tire; designating a currently attached tire from among the displayed tires and switching to a threshold for judging decrease in internal pressure which matches the tire; judging decrease in internal pressure of a tire by using the threshold; and issuing an alarm on the basis of the judgment of the judging means. Since thresholds which match tires can be suitably switched when the driver operates the touch panel for discriminating presently mounted tires, it is possible to eliminate erroneous alarm and to perform judgment of decompression at even higher accuracy.

6 Claims, 7 Drawing Sheets

METHOD AND APPARATUS FOR ALARMING DECREASE IN TIRE AIR-PRESSURE AND THRESHOLD CHANGING PROGRAM

This nonprovisional application claims priority under 35 U.S.C. § 119(a) on patent application No. 2002-264068 filed in Japan on Sept. 10, 2002, which is herein incorporated by reference.

BACKGROUND OF THE INVENTION

The present invention relates to a method and apparatus for alarming decrease in tire air-pressure and a threshold changing program. More particularly, it relates to a method and apparatus for alarming decrease in tire air-pressure and a threshold changing program with which it is possible to detect decompression of a tire and to issue an alarm to a driver.

A system for alarming decrease in tire air-pressure (DWS) in which decompression of a tire is detected on the basis of rotational (wheel speed) information of four wheel tires is conventionally known. Such a system employs a theory that a rotational velocity or a rotational angular velocity of a decompressed tire is increased when compared to remaining normal tires owing to a decrease in outer diameter (dynamic load radius of the tire) from that of a tire of normal internal pressure. For example, in a method for detecting decrease in internal pressure on the basis of a relative difference in rotational angular velocities of tires, $$DEL=\{(F1+F4)/2-(F2+F3)/2\}/\{(F1+F2+F3+F4)/4\}\times 100(\%)$$

is employed as a judged value DEL (reference should be made to Japanese Unexamined Patent Publication 305011/1988). Here, F1 to F4 denote rotational angular velocities of a front left tire, a front right tire, a rear left tire and a rear right tire, respectively.

It is judged that decompression of a tire is present when a value, which is obtained by calculating the above judged value DEL and performing necessary corrections such as cornering correction and rejections of unnecessary data, has exceeded a preliminarily set threshold, and an alarm is accordingly issued to the driver.

It is also known for an apparatus for alarming decrease in tire air-pressure which detects conditions of air-pressures of tires to issue alarm by extracting a resonance frequency of an oscillation frequency based on the wheel speed pulse of the vehicle and by comparing a decreased deviation which is based on the resonance frequency with a specified deviation (reference should be made to Japanese Unexamined Patent Publication 133831/1993).

In a method for detecting decrease in internal pressure on the basis of relative differences between rotational angular velocities of the tires, the thresholds will be inherent to the tires so that they need to be selected to correspond to kinds of tires such as summer tires, winter tires or run-flat tires with which it is possible to temporarily continue running even in the presence of a burst.

However, in the case of presently performed tunings, the threshold needs to be fixed, and it is thus set to be an intermediate value of the summer tires and winter tires since an alarm should be made even if the tires are exchanged from standard tires to studless tires. It might therefore happen that inconveniences such as erroneous alarm or no or delayed issuance of alarm even in the presence of decompression are caused.

On the other hand, in the apparatus for detecting conditions of air-pressure of tires on the basis of the resonance frequency of the oscillation frequency and accordingly issuing alarm, in the presence of a decompression by 30% in a studless tire and a run-flat tire, the frequency characteristics of the studless tire will be largely changed while the frequency characteristics of the run-flat tire will hardly be changed. Problems such as erroneous alarm are accordingly caused when setting the threshold as discussed above.

SUMMARY OF THE INVENTION

In view of the above facts, it is an object of the present invention to provide a method and apparatus for alarming decrease in tire air-pressure and a threshold changing program with which it is possible to prevent erroneous alarm and to improve the accuracy of judging decrease in air-pressure.

In accordance with a first aspect of the present invention, there is provided a method for alarming decrease in tire air-pressure, which detects decrease in internal pressure of a tire attached to a vehicle and accordingly issues alarm. The method includes the steps of: detecting rotational information of the respective tires; storing the rotational information of the respective tires; displaying a summer tire, a winter tire and a run-flat tire; designating a currently attached tire from among the displayed tires and switching to a threshold for judging decrease in internal pressure which matches the tire; judging decrease in internal pressure of a tire by using the threshold; and issuing an alarm on the basis of the judgment of the judging means.

In accordance with a second aspect of the present invention, there is provided an apparatus for alarming decrease in tire air-pressure, which detects decrease in internal pressure of a tire attached to a vehicle and accordingly issuing alarm. The apparatus includes: a rotational information detecting means which detects rotational information of the respective tires; a rotational information storing means which stores the rotational information of the respective tires; a type displaying means which displays a summer tire, a winter tire and a run-flat tire; a threshold changing means which designates a currently attached tire from among the tires displayed in the type displaying means and switches to a threshold for judging decrease in internal pressure which matches the tire; a judging means which judges decrease in internal pressure of a tire by using the threshold; and an alarm means which issues an alarm on the basis of the judgment of the judging means.

In accordance with a third aspect of the present invention, there is provided a threshold changing program, in which for changing a threshold which is used for judging decrease in tire air-pressure to meet a type of a tire, a computer is made to function as a type displaying means which displays a summer tire, a winter tire and a run-flat tire; and a threshold changing means which designates a currently attached tire from among the tires displayed in the type displaying means and switches to a threshold for judging decrease in internal pressure which matches the tire.

DETAILED DESCRIPTION

The apparatus and method for alarming decrease in tire air-pressure according to the present invention will now be explained on the basis of the accompanying drawings.

Figure 1:
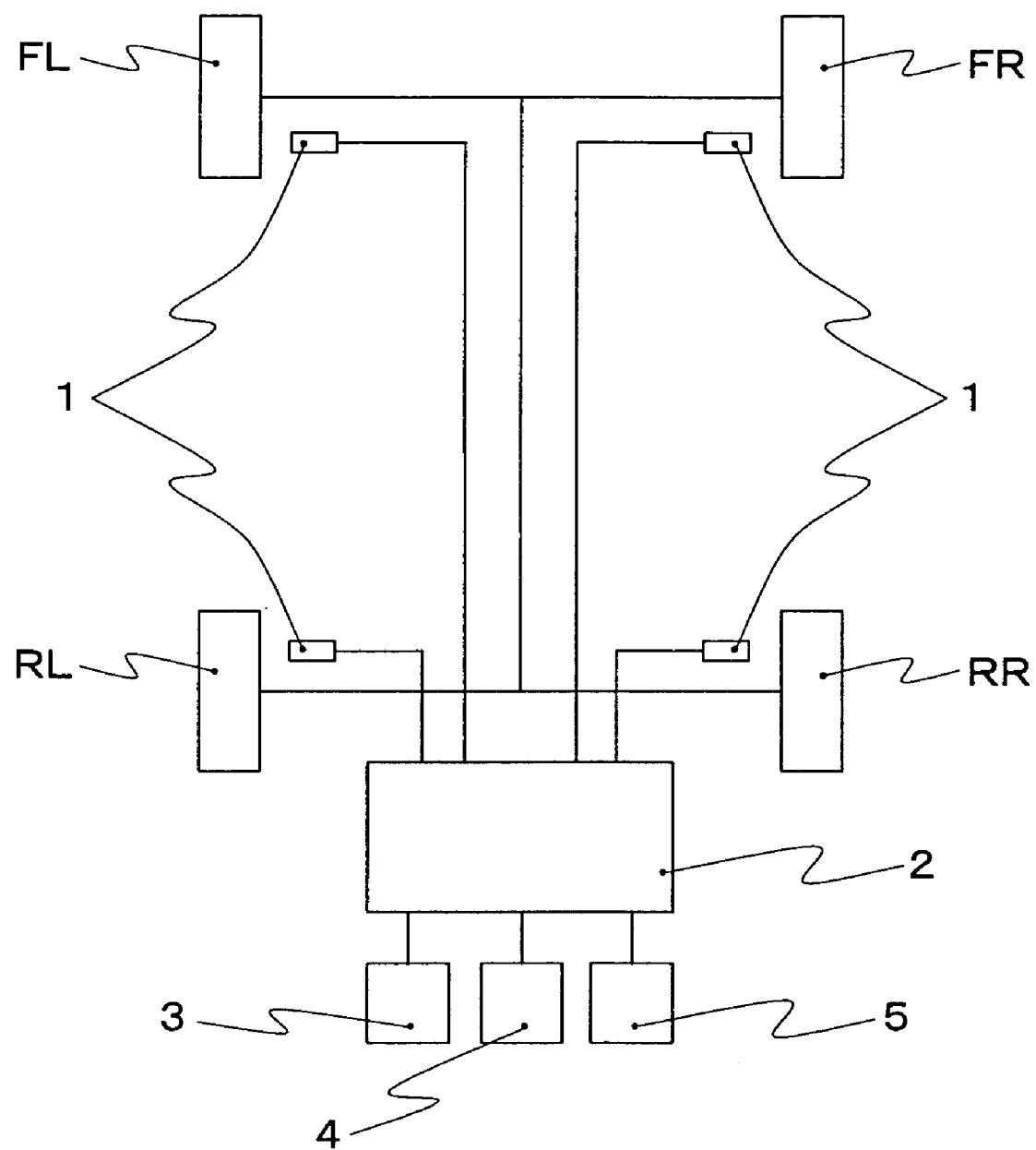
FIG. 1 is a block diagram illustrating one embodiment of an apparatus for alarming decrease in tire air-pressure according to the present invention.

As shown in FIG. 1, the apparatus for alarming decrease in tire air-pressure is for detecting whether air-pressure of any of four tires FL, FR, RL and RR (hereinafter generally referred to as Wi, wherein i=1 to 4, 1: front left tire, 2: front right tire, 3: rear left tire, 4: rear right tire) attached to a four-wheeled vehicle is decreased or not, and for issuing an alarm and includes ordinary rotational information detecting means 1 respectively provided for each of the tires Wi.

The rotational information detecting means 1 might be a wheel speed sensor for detecting rotational information by measuring wheel speed pulses (detected signals) by using an electromagnetic pickup or similar, or an angular velocity sensor in which power is generated by using rotation such as in a dynamo, wherein the wheel speed pulses is measured from a voltage thereof. Outputs of the rotational information detecting means 1 are supplied to a control unit 2 which might be a computer such as an ABS. A display 3 comprising liquid crystal elements, plasma display elements or CRT for informing a tire Wi of which the tire air-pressure has decreased, an initialization switch 4 which might be operated by a driver and an alarm 5 are connected to the control unit 2.

Figure 2:
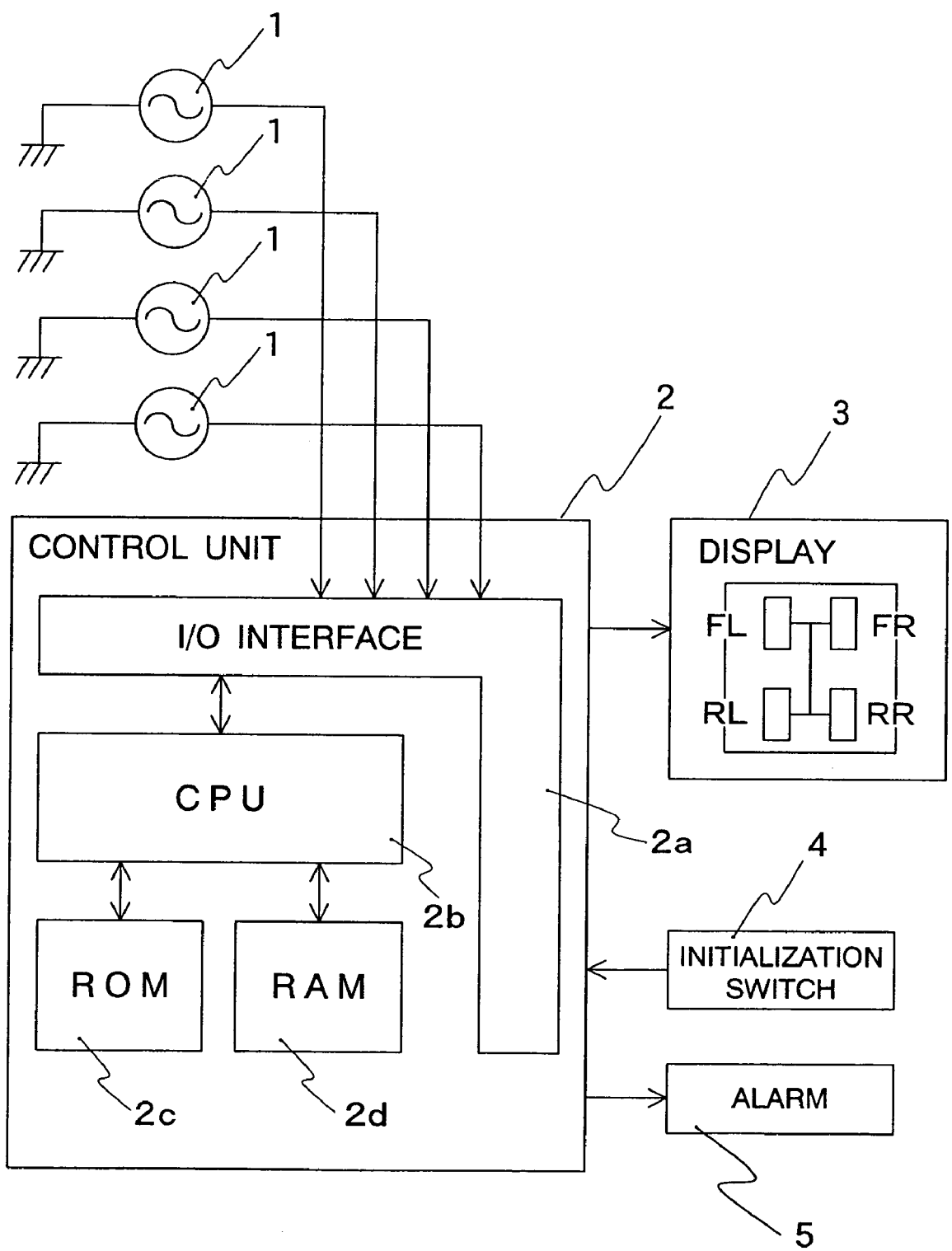
FIG. 2 is a block diagram illustrating electric arrangements of the apparatus for detecting decrease in tire air-pressure of FIG. 1.

As shown in FIG. 2, the control unit 2 comprises an I/O interface $2a$ required for sending/receiving signals to/from an external device, a CPU $2b$ which functions as a center of calculation, a ROM $2c$ which stores a control operation program for the CPU $2b$, and a RAM $2d$ into which data are temporally written and are read out therefrom when the CPU $2b$ performs control operations.

In the CPU $2b$, rotational angular velocities $F_i$ for the respective tires Wi are calculated on the basis of the wheel speed pulses as output from the rotational information detecting means 1 at specified sampling periods $\Delta T(sec)$, for instance, $\Delta T=1$. The wheel speed is then calculated from the rotational angular velocities $F_i$ for the respective tires Wi. Decrease in internal pressure of a tire might be detected similar to the prior art on the basis of the rotational information of the wheel speeds.

Since the wheel speed pulses output from the rotational information detecting means 1 include oscillation frequency components of the tires, it is possible to obtain frequency characteristics indicating two peak values for the resonance frequency in vertical directions and resonance frequency in lateral directions in the presence of the springs of the vehicle when performing frequency analysis of wheel speed pulses. By extracting at least one of the resonance frequency in vertical directions and resonance frequency in lateral directions in the presence of the springs of the vehicle and by comparing a decreased deviation on the basis of the resonance frequency with a specified deviation, it is possible to detect decrease in the internal pressure of the tire. Since resonance frequencies might be determined upon designating up to sizes of tires when employing such an apparatus, it is possible to obtain a DWS of high accuracy.

The method and apparatus for detecting decrease in internal pressure of a tire on the basis of wheel speed information will now be explained.

In the present embodiment, the alarm threshold value of the DWS software is switched when the driver designates a type of the tires presently attached by using a touch panel or the like. When tires are exchanged from, for instance, summer tires to winter tires, a display is provided on the touch panel with which it is possible to select tires, and the threshold is changed to suit winter tires when the driver makes a choice accordingly. With this arrangement, it is possible to prevent erroneous alarm and to improve the accuracy of judging decrease in air-pressure. Types of tires might be summer tires, winter tires and run-flat tires with which it is possible to temporally continue running even in the presence of a burst.

The apparatus for alarming decrease in tire air-pressure according to the present embodiment comprises a rotational information detecting means 1 which detects rotational information of the respective tires; a rotational information storing means which stores the rotational information of the respective tires; a type displaying means which displays a summer tire, a winter tire and a run-flat tire; a threshold changing means which designates a currently attached tire from among the tires displayed in the type displaying means and switches to a threshold for judging decrease in internal pressure which matches the tire; a judging means which judges decrease in internal pressure of a tire by using the threshold; and an alarm as an alarm means which issues an alarm on the basis of the judgment of the judging means.

The threshold changing program according to the present embodiment is so arranged that the control unit 2 is made to function as the type displaying means which displays a summer tire, a winter tire and a run-flat tire, and the threshold changing means which designates a currently attached tire from among the tires displayed in the type displaying means and switches to a threshold for judging decrease in internal pressure which matches the tire.

In the judging means, the judged value (DEL) for detecting decrease in air-pressure of a tire might be one in which, for instance, differences between two diagonal sums of the front wheel tires and the rear wheel tires are compared. In this method, a sum of signals of one pair of wheels located on one diagonal line is subtracted from a sum of signals of the other pair of wheels located on the other diagonal line, and a ratio of this obtained value to an average value of the two sums is obtained from the following equation (1).

$$DEL=\{(V1+V4)/2-(V2+V3)/2\}/\{(V1+V2+V3+V4)/4\}100(\%) \qquad (1)$$

Generally, winter tires are tires with different tread patterns and materials with which it is possible to run on snowy roads, and are tires including indications such as "SNOW", "M+S", "STUDLESS", "ALL WEATHER" or "ALL SEASON" on sidewall portions thereof.

Summer tire are tires including no indications as listed above at sidewall portions unlike the winter tires.

It is an additional difference between summer tires and winter tires that those tires have different degrees of tread pattern rigidities. More particularly, tires having a large pattern rigidity largely affecting control of the vehicle or the accuracy of detecting internal pressure are summer tires, and those having a small pattern rigidity are winter tires.

The run-flat tires might be denovo-type run-flat tires, N-type run-flat tires or double-structured run-flat tires.

Figure 3:
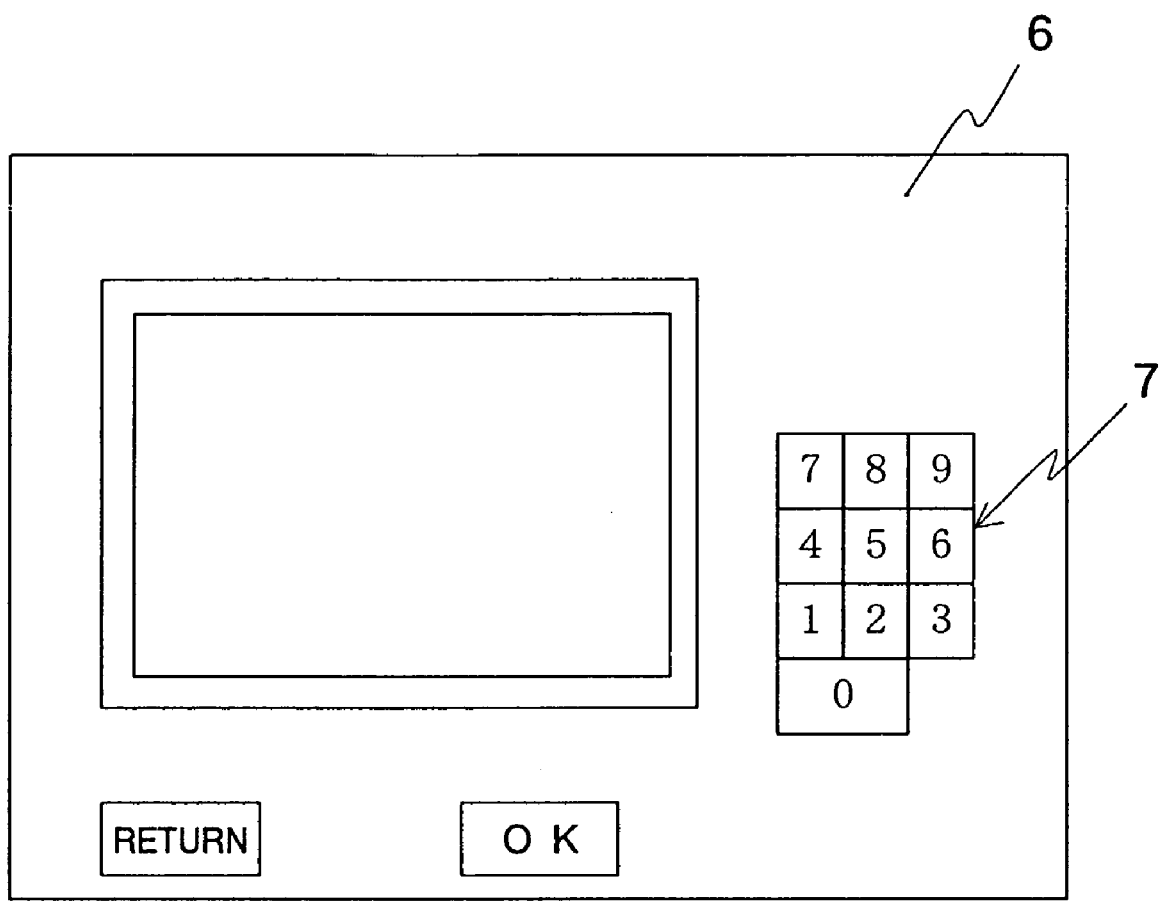
FIG. 3 is a view illustrating one example of a touch panel of a navigation device.
Figure 4:
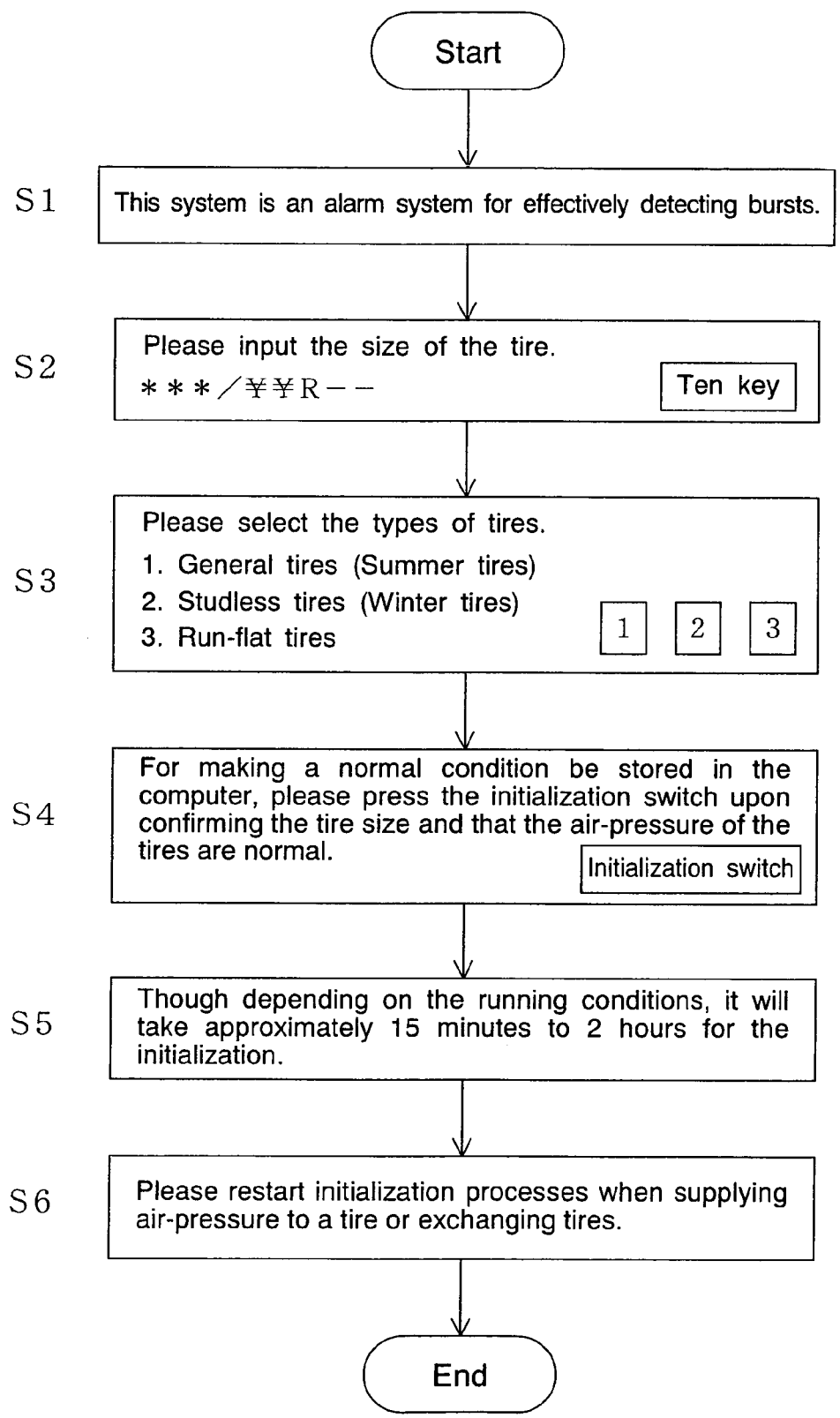
FIG. 4 is a flowchart for explaining actions of the apparatus for detecting decrease in tire air-pressure.
Figure 5:
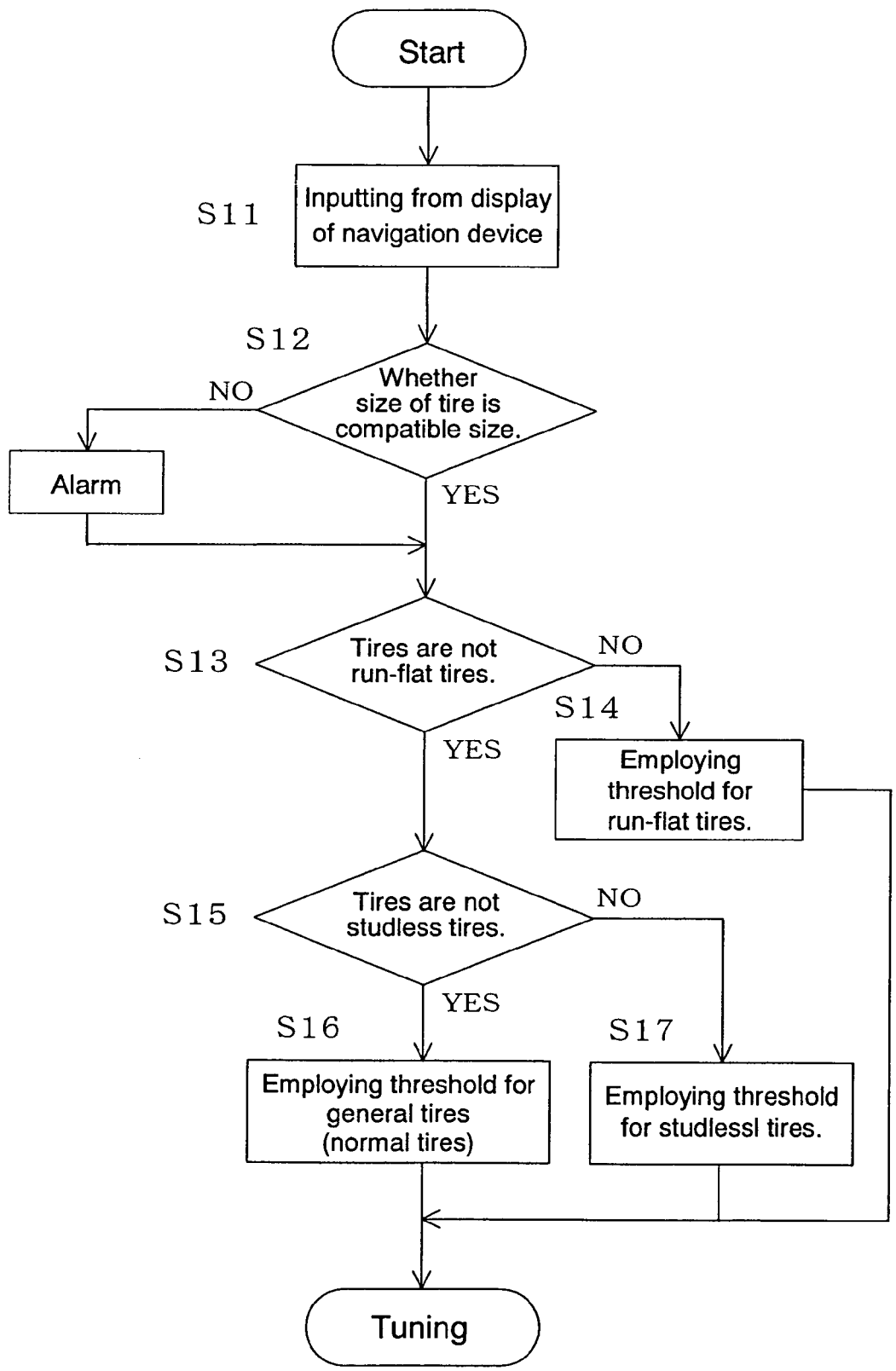
FIG. 5 is a flowchart for changing a threshold.

Actions of the apparatus for alarming decrease in tire air-pressure according to the present embodiment will now be explained on the basis of FIGS. 3 to 5. When a power source of a touch panel 6 of a navigation device, which is connected to the apparatus for alarming decrease in tire air-pressure, is first switched ON, it is displayed on a display screen "this system is an alarm system for effectively detecting bursts" (Step S1). When a return key is pressed, this display screen returns to a previous screen, and when an OK key is pressed, it proceeds to a following screen. In response to an inquiry "please input the size of the tire", a tire size of a currently attached tire is input by using ten keys 7 (Step S2). As for the types of tires, general tires (summer tires), studless tires or run-flat tires are selected, and any one of key 1, key 2 or key 3 are pressed (Step S3). At this time, for making a normal condition be stored in the computer, the initialization switch is pressed upon confirming the tire size and that the air-pressure of the tires are normal (Step S4). In this manner, it is determined whether the tire size is a compatible size (for instance, when 195/60R15 is the standard, tire sizes such as 205/50R16 and 185/70R14, of which radii are common) (Step S12). When it is determined that it is not a compatible size, an alarm is issued since inconveniences are caused in view of the speed meter or others, but when it is determined that it is a compatible size, the program proceeds to the next step. Simultaneously therewith, the display screen displays "though depending on the running conditions, it will take approximately 15 minutes to 2 hours for the initialization" (Step S5) whereupon it is called for attention to restart initialization processes when supplying air-pressure to a tire or exchanging tires (Step S6).

On the other hand, it is determined in the alarm means whether the tires which are to be attached are run-flat tires or not (Step S13). When it is determined that the tires are run-flat tires, a threshold for run-flat tires is employed for starting tuning (Step S14). When it is determined that the tires are no run-flat tires, it is determined whether the tires are studless tires or not (Step S15). When it is determined that the tires are no studless tires, a threshold for general tires is employed for starting tuning (Step S16). In contrast thereto, when it is determined that the tires are studless tires, a threshold for studless tires is employed for starting tuning (Step S17).

The car navigation device might be one in which the current running spot is detected by using a GPS (global positioning system) antenna or similar and map data of the periphery thereof are input to the car navigator main body through a CD-ROM or the like, to display pieces of geographic information on the display panel through geographic display routine processes and in which pieces of road information are received via a beacon antenna or the like from external transmitters such as beacons or FM transmitters disposed for the roads so that road information might be additionally displayed on the display panel through display routine processes of the navigator main body. When employing such a car navigation device, it is possible to employ a display panel of which screen is switchable as the indicator.

While the present invention will now be explained on the basis of examples thereof, the present invention is not to be limited to such examples only.

EXAMPLE

Three types of tires, namely summer tires (tire size: 195/60R15 SP10), studless tires of winter tires (tire size: 185/70R14 DS1) and run-flat tires (tire size: 205/50R16) were provided as the tires. The air-pressure of the tires of the vehicle to which the respective tires were attached was set such that the front left tire, the right tire and the rear right tire were of normal air-pressure ($1.96 \times 10^4$ Pa) while the rear left tire was decompressed by 25%.

Figure 6:
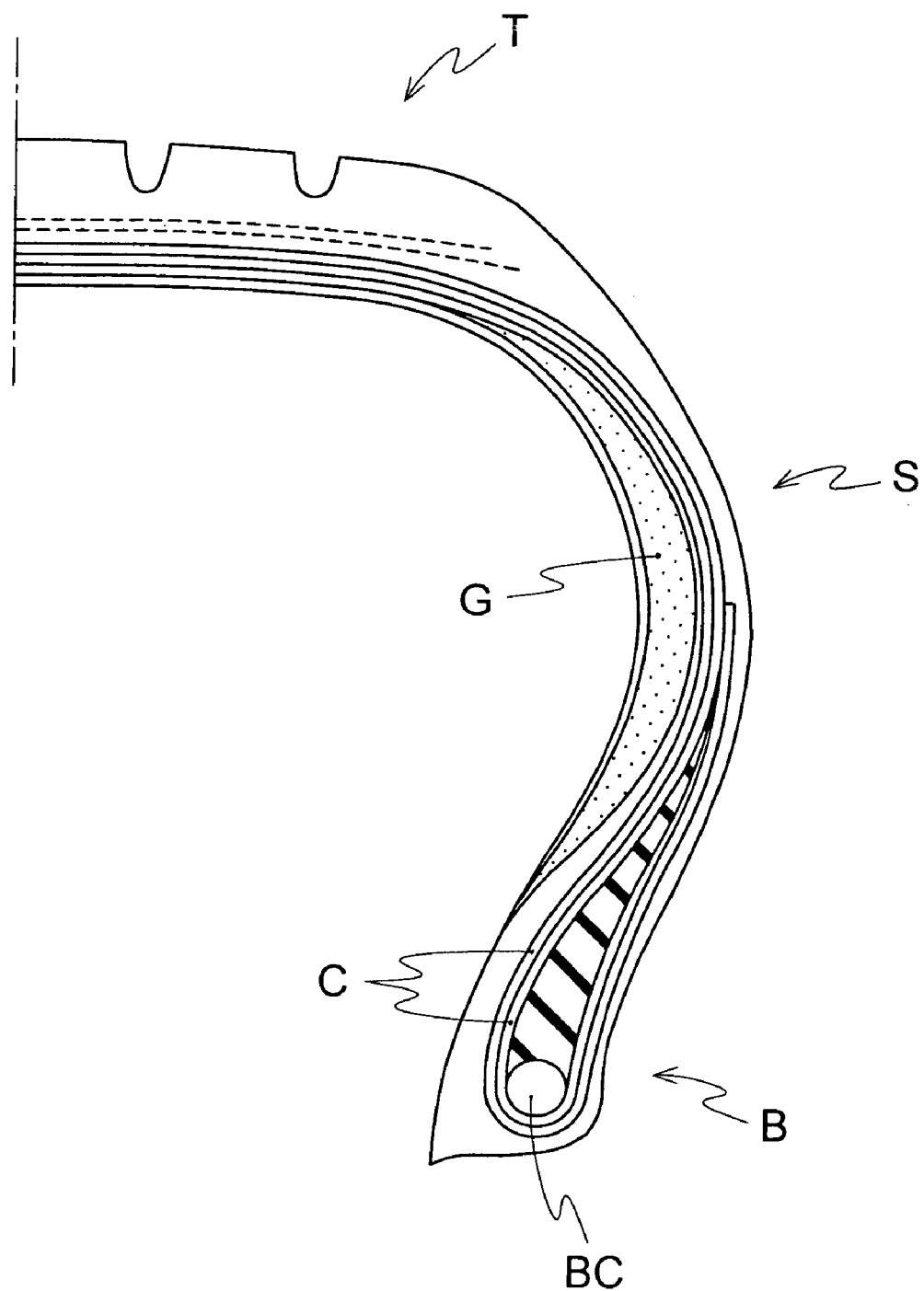
FIG. 6 is a schematic sectional view of a run-flat tire used in the examples.

Note that the run-flat tires are tubeless tires and are so-called side reinforced type run-flats which includes, as shown in FIG. 6, carcasses C of radial structure which extend from the tread portions T up to bead cores BC of bead portions B via sidewall portions S on both sides and which are provided with reinforced layers G of hard rubber inside of the sidewalls.

Figure 7:
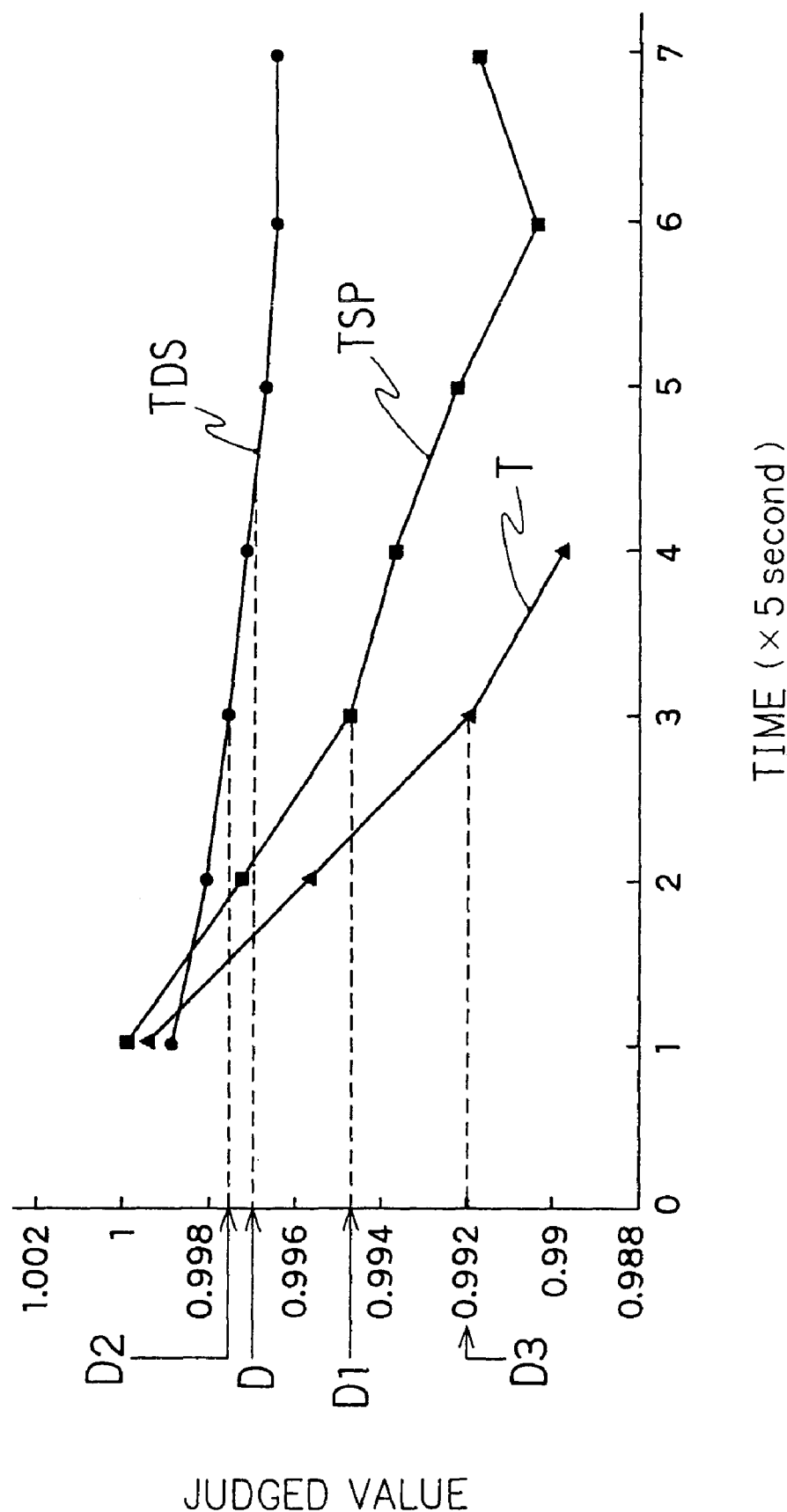
FIG. 7 is a view indicating the relationship between judged value and time.

Upon setting an intermediate value between the threshold for the summer tires and the threshold for the winter tires like in the prior art, running tests were performed. The intermediate value of the present embodiment was D=0.997. The judged values were calculated on the basis of the above-described equation (1). It was consequently found that, as shown in FIG. 7, the time required until alarm was issued was 11 seconds for the summer tires TSP, 22 seconds for the studless tires TDS and 8.4 seconds for the run-flat tires.

The thresholds D1 (0.9948), D2 (0.9976) and D3 (0.992) were exclusively set for the summer tires TSP, studless tires TDS and run-flat tires T for performing the same running tests, and it was found that alarm was issued by the alarm of the vehicle to which summer tires TSP, studless tires TDS and run-flat tires T were attached after almost the same amount of time (15 seconds).

It can be understood therefrom that by performing judgment of decrease in internal pressure of tires upon switching to a threshold for judging decrease in internal pressure suitable for the tires and by using this threshold, erroneous alarm could be eliminated and judgment of decompression could be made at even higher accuracy.

As explained so far, according to the present invention, since thresholds which match tires can be suitably switched when the driver operates the touch panel for discriminating presently mounted tires, it is possible to eliminate erroneous alarm and to perform judgment of decompression at even higher accuracy.

What is claimed is:

1. A method for alarming decrease in tire air-pressure, which detects decrease in internal pressure of a tire attached to a vehicle equipped with a navigation device including a user-operable display and accordingly issues an alarm, the method comprising the steps of:

detecting rotational information of the respective tires;
   storing the rotational information of the respective tires;
   displaying, on the user-operable display, a summer tire, a winter tire and a run-flat tire;
   designating a currently attached tire from among the displayed tires and switching to a threshold for judging decrease in internal pressure which matches the tire;
   judging decrease in internal pressure of a tire by using the threshold; and
   issuing the alarm on the basis of the judgment of the judging means.

2. An apparatus for alarming decrease in tire air-pressure, which detects decrease in internal pressure of a tire attached to a vehicle equipped with a navigation device including a user-operable display and accordingly issues an alarm, the apparatus comprising:

a rotational information detecting means which detects rotational information of the respective tires;
   a rotational information storing means which stores the rotational information of the respective tires;

the user-operable display providing a display of a summer tire, a winter tire and a run-flat tire;

a threshold changing means which designates a currently attached tire from among the tires displayed in the user-operable display and switches to a threshold for judging decrease in internal pressure which matches the tire;

a judging means which judges decrease in internal pressure of a tire by using the threshold; and an alarm means which issues the alarm on the basis of the judgment of the judging means.

3. A threshold changing program carried on a computer-readable medium, for changing a threshold which is used for judging decrease in tire air-pressure to meet a type of a tire on a vehicle equipped with a navigation device including a user-operable display, the program when executed, causing a computer to function as a tire type displaying means which causes, on the user-operable display, a display of a summer tire, a winter tire and a run-flat tire; and a threshold changing means which designates a currently attached tire from among the tires displayed in the type displaying means and switches to a threshold for judging decrease in internal pressure which matches the tire.

4. The method as recited in claim 1, wherein the user-operable display is a touch panel display.

5. The apparatus as recited in claim 2, wherein the user-operable display is a touch panel display.

6. The program as recited in claim 3, wherein the user-operable display is a touch panel display.

* * * * *